D. C. WEBB & W. G. STEPHENS.
RAT TRAP.
APPLICATION FILED FEB. 7, 1916.
1,181,496.
Patented May 2, 1916.
2 SHEETS—SHEET 2.
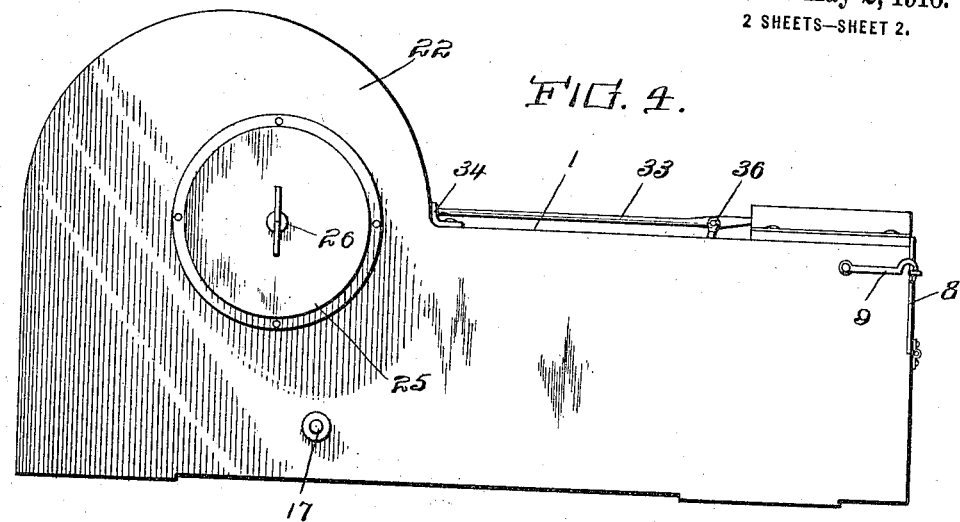
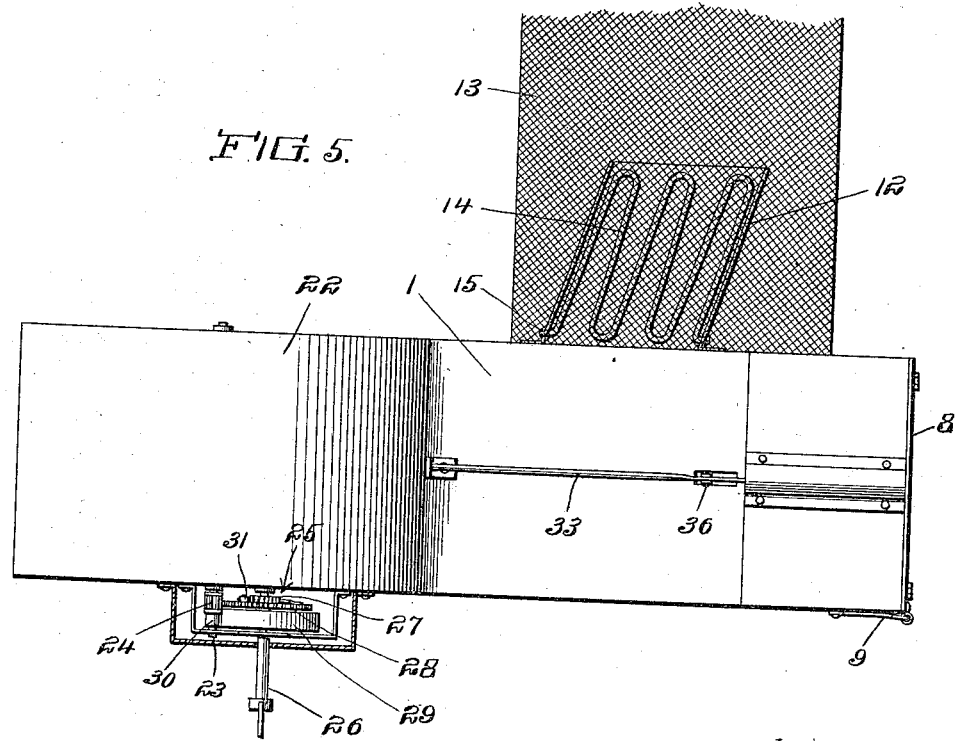
Witnesses
A. C. Newkirk
J. W. Garner
Inventors
D. C. Webb
W. G. Stephens
By Victor J. Evans
Attorney

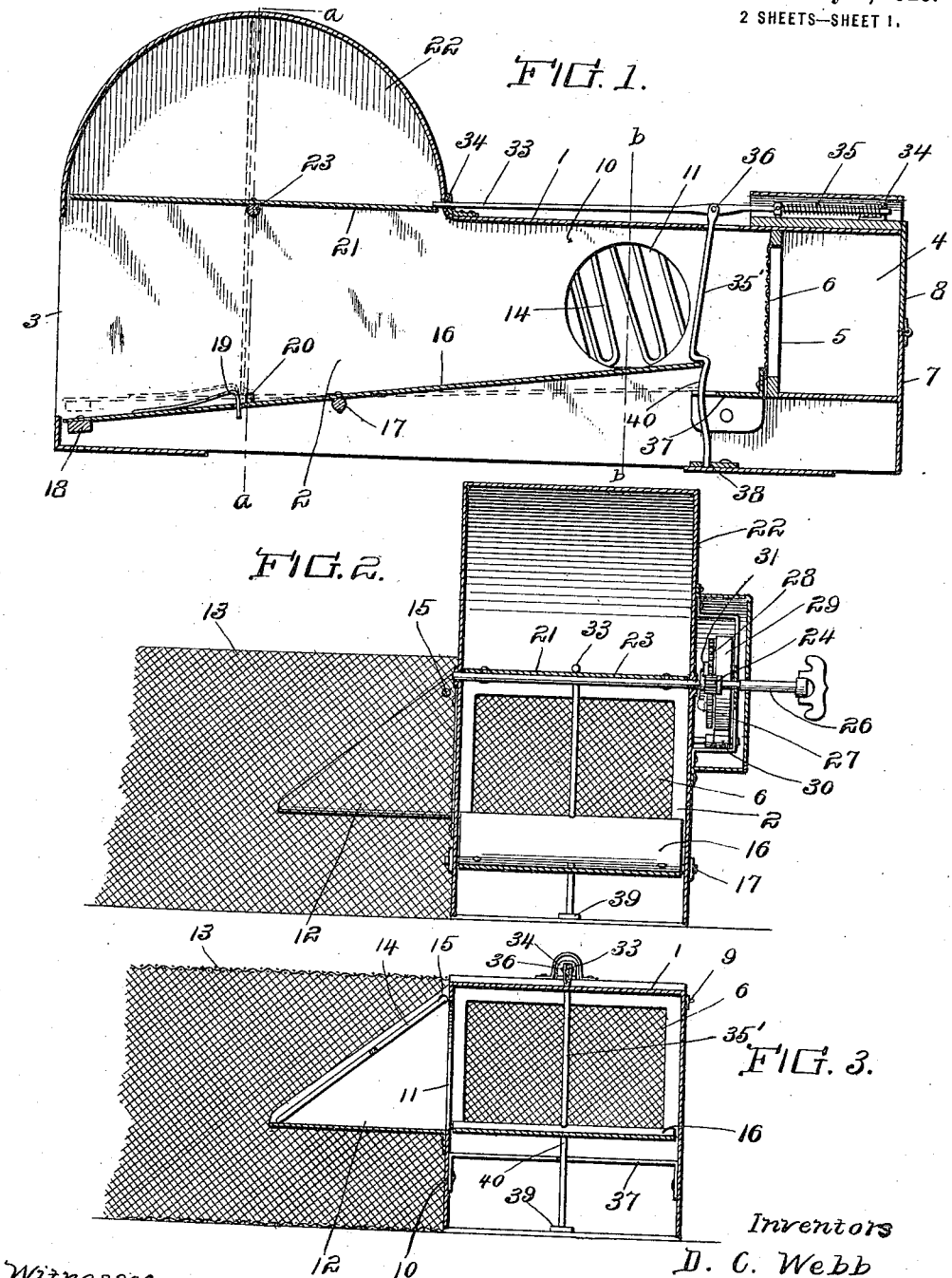

UNITED STATES PATENT OFFICE.

DICK C. WEBB AND WILLIAM G. STEPHENS, OF CLARINDA, IOWA.

RAT-TRAP.

1,181,496. Specification of Letters Patent. Patented May 2, 1916.

Application filed February 7, 1916. Serial No. 76,754.

*To all whom it may concern:*

Be it known that we, DICK C. WEBB and WILLIAM G. STEPHENS, citizens of the United States, residing at Clarinda, in the county of Page and State of Iowa, have invented new and useful Improvements in Rat-Traps, of which the following is a specification.

This invention relates to improvements in self setting traps for catching rats and other small animals, the object of the invention being to provide an improved trap of this kind which is simple in construction, is automatic in operation, is not likely to get out of order and which requires but little attention.

The invention consists in the construction, combination, and arrangement of devices, hereinafter described and claimed.

In the accompanying drawings: Figure 1 is a longitudinal sectional view of a trap constructed in accordance with our invention. Fig. 2 is a transverse sectional view of the same on the plane indicated by the line *a—a* of Fig. 1. Fig. 3 is a similar view on the plane indicated by the line *b—b* of Fig. 1. Fig. 4 is a side elevation of the same. Fig. 5 is a plan of the same.

In the embodiment of our invention, we provide a structure or body 1 which has a run way 2 therein, open at one end as at 3, a bait chamber 4 being at the opposite end of the run way separated therefrom by a partition 5 which has a screened opening 6. The end of the structure in which the bait chamber is located is formed by a wall 7 which has a hinged door 8 to permit bait to be placed in or removed from the bait chamber, said door having a suitable fastening device 9. In one side wall 10 of the body, at a point near the inner end of the run way and near the bait chamber, is an opening 11 of sufficient size for the passage of the animals therethrough, said opening affording access to a chute 12 which leads into a cage 13 arranged at one side of the body 1. The chute is normally closed by a gravity acting gate 14 which is pivotally mounted at its upper side as at 15 and which may be readily lifted by an animal passing through the opening 12, so as to enable such animal to pass through the chute and into the cage, but prevent an animal from passing from a cage through the opening 11 back into the run way.

The bottom of the run way is formed by a tilting platform 16 which is pivoted as at 17 at a point intermediate its ends. The outer end of the platform is provided with a weight 18 so that the platform is normally arranged with its outer end depressed and its inner end elevated. At a suitable distance from its outer end the platform is provided with a spring detent 19. A stop 20 is fixedly secured to the platform, projects upwardly therefrom and is spaced a suitable distance from the detent 20.

A revoluble gate 21 is provided which is arranged for rotation in a vertical plane at a point near the outer end of the run way and in a semi-circular vertical extension 22 of the body. This gate has a shaft 23 which is mounted in bearings in the side walls of the body or structure and is provided near one end with a pinion 24. A spring motor 25 is provided to turn the gate and is here shown as comprising a winding shaft 26, a ratchet wheel 27, fixed to said shaft, a gear 28 loose on said shaft and engaged with the pinion, a spring 29 coiled on the shaft, having one end attached thereto and the other end secured as at 30 and a spring pressed pawl 31 carried by the gear 28 and which normally engages the ratchet wheel, permits the spring to be wound by turning the shaft 26 by means of a suitable key and prevents reverse turning of said shaft. We also provide a locking rod 33 to engage the gate and normally hold the latter in open position as indicated in full lines in Fig. 1. This locking rod is arranged for longitudinal movement in guides 34 and a spring 35 is provided which normally holds the locking rod in engaged position, that is with its inner end projecting through the peripheral wall of the extension 22 and arranged in the path of the gate so that the latter by the action of the spring motor is normally held in open position and against the lower side of the inner end of said locking rod. A lever 35′ is pivotally connected as at 36 to the locking rod, extends down through an opening in a stop flange 37 below the inner end of the platform and has its lower end attached as at 38 to a base bar 39 under the body.

The operation of the trap is as follows: The gate is normally in open position as hereinbefore stated. When an animal attracted by the bait, enters the run way through the opening 3, it walks upon the platform, the outer end of which is normally depressed by the weight 18, and passes under the gate. As the animal nears the inner end of the platform, its weight overcomes that of the weight 18 so that the inner end of the platform is depressed. The downward movement of the inner end of the platform causes the latter which is in sliding contact with a cam portion 40 of the lever, to cause the lever to draw the lack rod 33 outwardly against the tension of its spring and thereby disengage the locking rod from the gate, whereupon the spring motor causes the gate to turn through half a revolution and assume a vertical position closing the run way, the gate passing over the detent 19 and being caught and held by the stop 20 owing to the elevated position of the inner end of the platform. The animal cannot leave the run way excepting through the opening 11 which leads to the cage. As the animal passes through said opening and under the gravity acting gate 14, its weight is relieved from the inner end of the platform so that the weight 18 incidentally depresses the outer end of the platform, thus disengaging the stop 20 from the gate 21 and also causing the lever to release the lock rod so that the spring on the lock rod returns the latter to its normal locking position, thus checking the gate as soon as it has reached horizontal open position, thus resetting the trap and hence the trap, without further attention, than to keep it supplied with bait, and to wind the spring of the motor, is adapted to catch a number of animals in succession and to turn all of them in the cage.

Having described the invention, what is claimed is:

In a trap, a structure having a run-way and an entrance to the run-way, a revoluble motor driven gate to close across the run-way, a spring projected locking rod to normally hold the gate in open position, a tilting platform forming the bottom of the run-way and having a stop near the entrance, means actuated by the platform when the inner end thereof is depressed to release the locking rod from the gate and permit the latter to turn to closed position and engage the said stop, and means to normally depress the outer end of the gate, raise the inner end thereof, and thereby cause the stop to disengage the gate and cause the latter to be returned to set position.

In testimony whereof we affix our signatures in presence of two witnesses.

DICK C. WEBB.
WILLIAM G. STEPHENS.

Witnesses:
  EDWIN O. LIST,
  C. L. BEECH.

Copies of this patent may be obtained for five cents each, by addressing the "Commissioner of Patents, Washington, D. C."